(12) United States Patent
    Des Champs

(10) Patent No.: US 9,777,957 B1
(45) Date of Patent: Oct. 3, 2017

(54) SYSTEMS, DEVICES, AND/OR METHODS FOR MANAGING CONDENSATE AND/OR WATER

(71) Applicant: Nicholas H. Des Champs, Las Vegas, NV (US)

(72) Inventor: Nicholas H. Des Champs, Las Vegas, NV (US)

( * ) Notice: Subject to any disclaimer, the term of this patent is extended or adjusted under 35 U.S.C. 154(b) by 13 days.

(21) Appl. No.: 14/830,892

(22) Filed: Aug. 20, 2015

Related U.S. Application Data

(60) Provisional application No. 62/123,751, filed on Nov. 28, 2014.

(51) Int. Cl.
*F16T 1/20* (2006.01)
*F25D 21/14* (2006.01)

(52) U.S. Cl.
CPC .................. *F25D 21/14* (2013.01)

(58) Field of Classification Search
CPC .. F24F 13/222; Y10T 137/3068; F16K 15/04; F25D 21/14
USPC .......... 137/192, 247.21, 247.23, 493.8, 526, 137/533.11; 62/272, 285, 288, 289
See application file for complete search history.

(56) References Cited

U.S. PATENT DOCUMENTS

| | | | | |
|---|---|---|---|---|
| 1,363,732 A * | 12/1920 | Heidmann | ............. | F16K 15/04 137/247.21 |
| 3,799,186 A * | 3/1974 | Bulin | ..................... | F16K 15/04 137/204 |
| 4,007,759 A * | 2/1977 | Martin | ................... | F16K 17/19 137/513.5 |
| 4,722,744 A * | 2/1988 | Stoll | .................... | B01D 53/265 137/192 |
| 4,856,550 A * | 8/1989 | Smelcer | ................... | F16T 1/22 126/110 R |
| 5,115,798 A * | 5/1992 | Moore, Jr. | ............. | F24H 8/006 122/14.1 |
| 5,644,925 A * | 7/1997 | Chaves | ................... | F24F 13/22 137/192 |
| 5,797,426 A | 8/1998 | Powell | | |
| 6,698,225 B2 | 3/2004 | Chaves | | |
| 6,931,882 B1 | 8/2005 | Yang | | |
| 7,389,651 B2 * | 6/2008 | Cantolino | .............. | C02F 1/688 62/285 |
| 7,854,238 B2 | 12/2010 | Zatarain | | |
| 8,555,915 B2 | 10/2013 | Brunner | | |
| 2003/0098061 A1 | 5/2003 | Stuchlik, III | | |

* cited by examiner

*Primary Examiner* — Reinaldo Sanchez-Medina
(74) *Attorney, Agent, or Firm* — Michael Haynes PLC; Michael N. Haynes

(57) ABSTRACT

Certain exemplary embodiments can provide a system, machine, assembly, device, and/or manufacture and/or a method for activities that can relate to, a condensate trap that can comprise a float and a housing configured to receive condensate from a condensate-producing source and contain the float, the condensate trap configured to allow condensate to exit from the housing to a condensate drain.

15 Claims, 15 Drawing Sheets

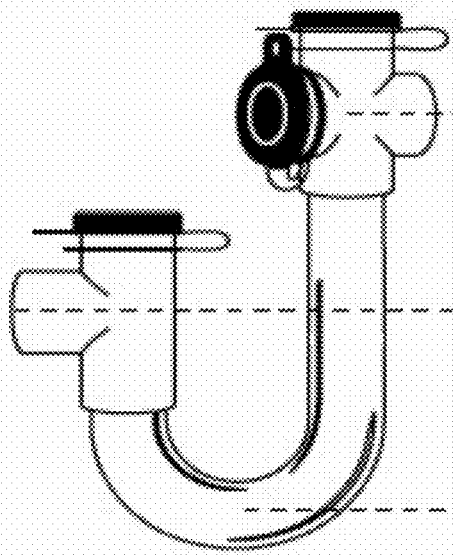
FIG. 1A – Prior Art
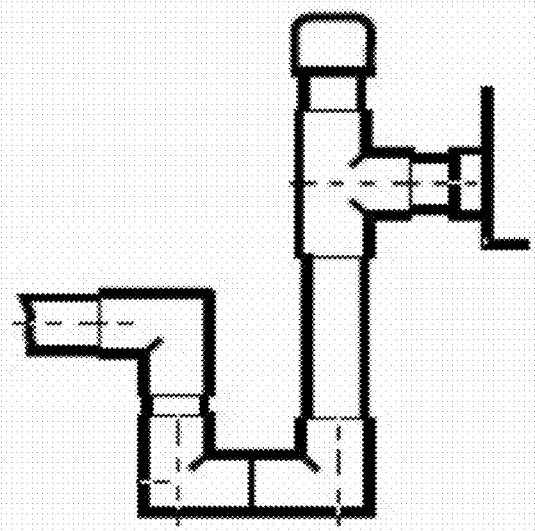
FIG. 1B – Prior Art

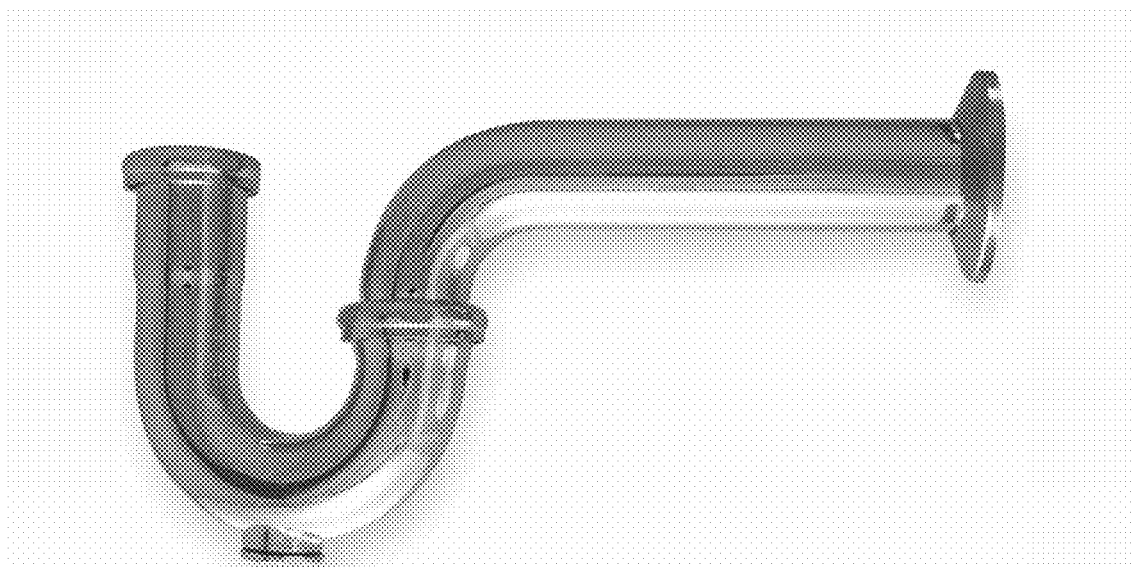
FIG. 2A – Prior Art
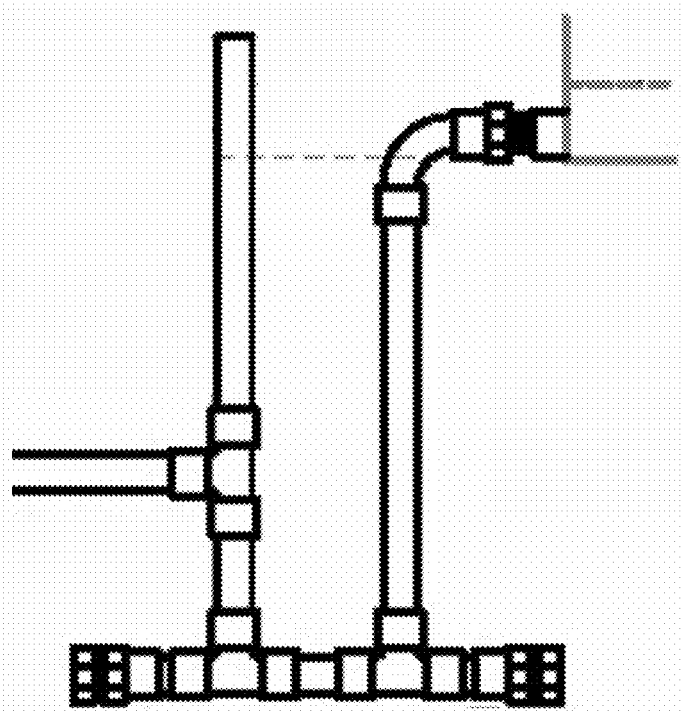
FIG. 2B – Prior Art

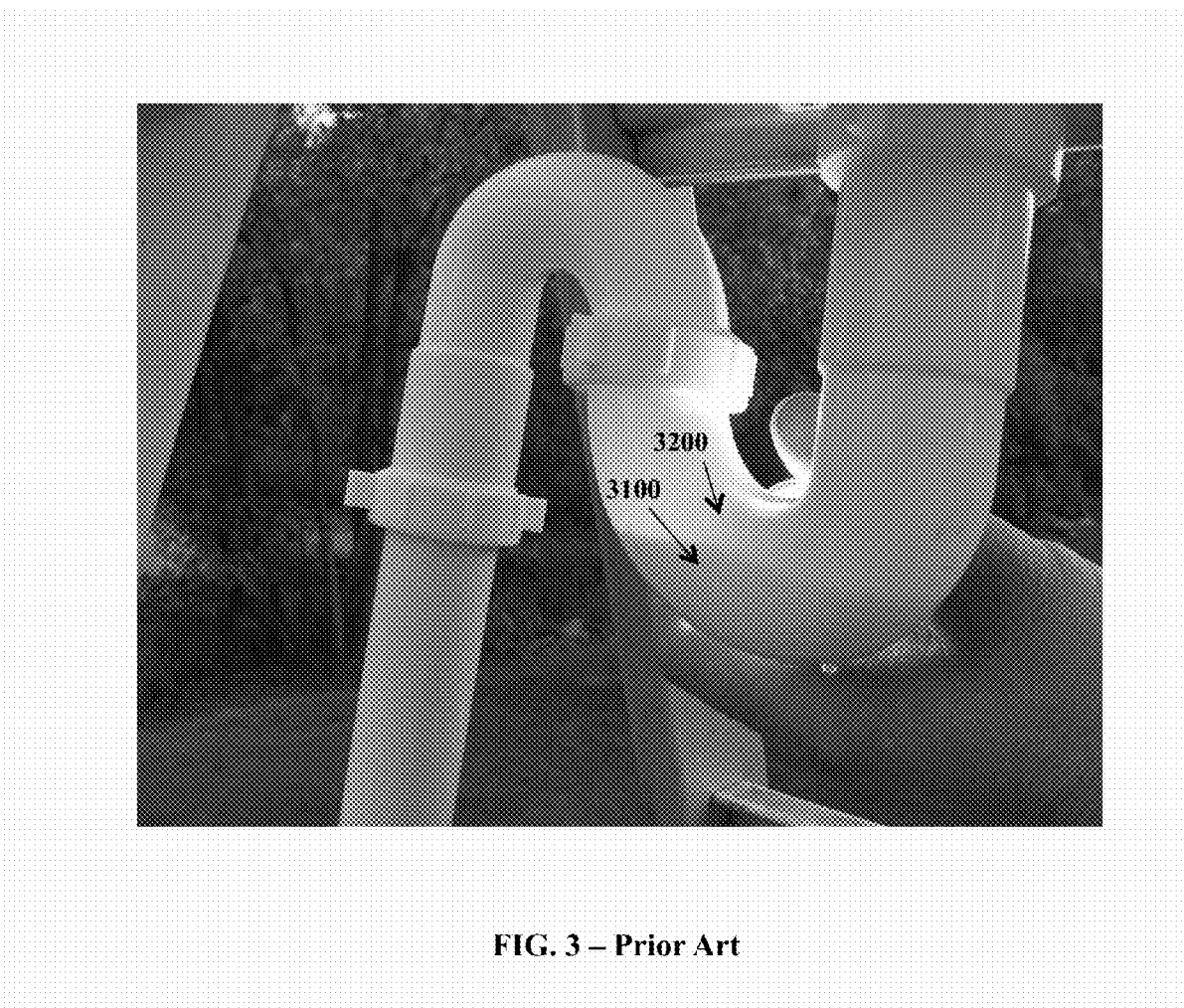
FIG. 3 – Prior Art

Operational Test of 1½-inch Negative Dry Ball Trap

| Run No. | Negative Pressure inches wc | Water Flow GPM | Comments |
|---|---|---|---|
| 1 | 3 | 3 | No backup in tubes, normal flow |
| 2 | 3 | 3 | No backup in tubes, normal flow |
| 3 | 8 | 4 | No backup in tubes, normal flow |
| 4 | 8 | 6 | Water turned off. Water dripping from end of drain line. There was no measurable air flowing into end of drain line after water was turned off or with water running. |
| 5 | 0 | 0 | Two hours after run No. 4 was initiated the negative pressure was reduced from 8 inches to zero. Essentially no water drained from line. |
| 6 | 0.5 | 0 | No measurable air flow into exit of drain line. |
| 7 | 8 | 0.1 | No problems at minimum water flow and high negative pressure. |

FIG. 15 ized description
SYSTEMS, DEVICES, AND/OR METHODS FOR MANAGING CONDENSATE AND/OR WATER

CROSS-REFERENCES TO RELATED APPLICATIONS

This application claims priority to, and incorporates by reference herein in its entirety, U.S. Provisional Patent Application 62/123,751, filed 28 Nov. 2014.

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which:

FIG. 1A is a side view of an exemplary embodiment of a P-style drain trap, showing the "P" shaped standpipe that can retain liquid at a sufficient height to be able to maintain a column of liquid comparable to the pressure differential between the inside of the corresponding condensate-producing unit and the ambient pressure.

FIG. 1B is a side view of an exemplary embodiment of a field-constructed P-trap.

FIG. 2A is side view of an exemplary embodiment of a P-style drain trap that is configured for cleaning out the debris or sludge that can accumulate at the lower bend in the P trap.

FIG. 2B is a side view of an exemplary embodiment of a field-constructed P-trap that is configured for cleaning.

FIG. 3 illustrates gas leakage from a condensate-producing unit if a P trap becomes dry.

FIG. 15 is a table listing operational test data for an exemplary negative pressure trap.

DETAILED DESCRIPTION

Figure 4:
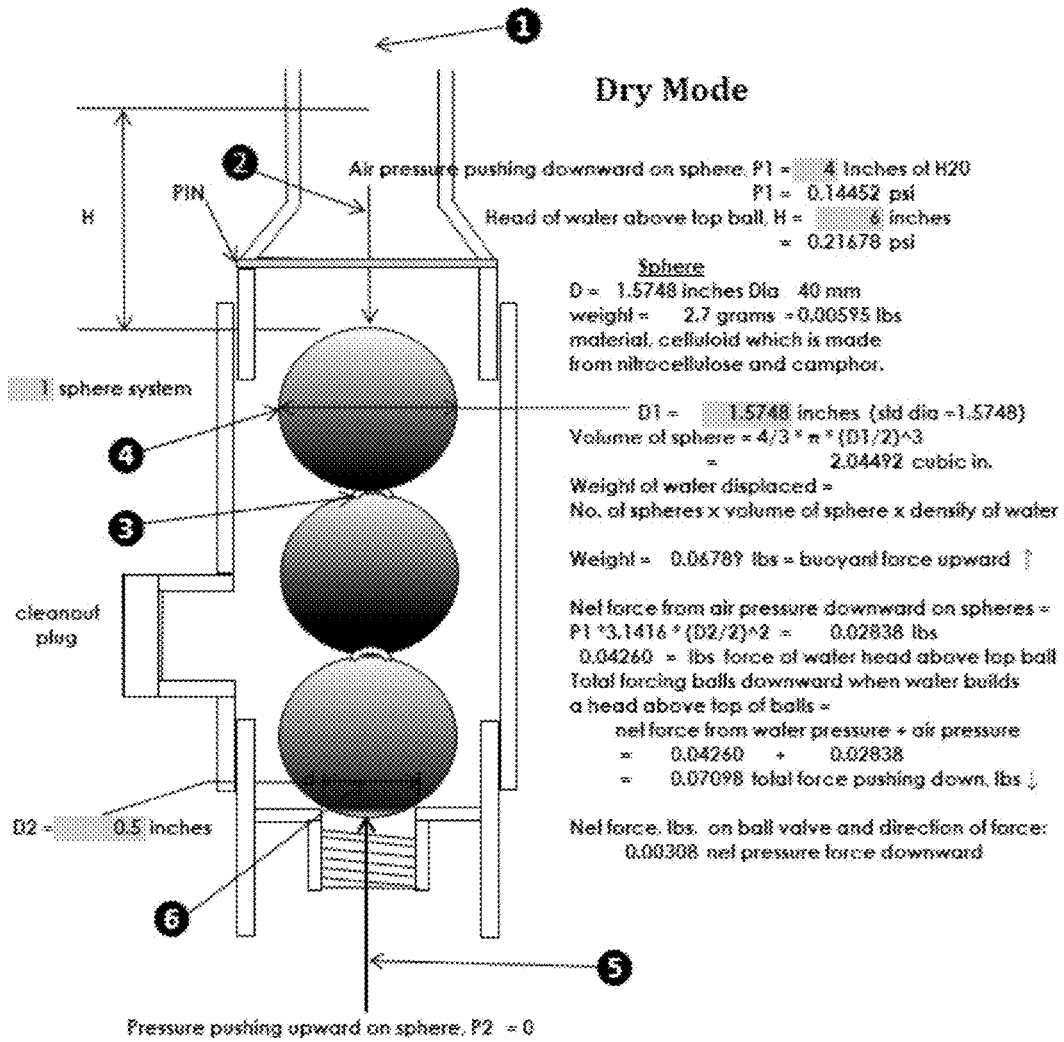
FIG. 4 is a drawing of an exemplary embodiment of a positive pressure trap with no condensate is being produced, and thus is in a dry mode.

Certain exemplary embodiments relate to the technical field of heating, ventilating, and air conditioning, or "HVAC". Certain exemplary embodiments are in the technical field of "traps" that allow liquid condensate to drain from a condensate source, such as piece of HVAC, ice-making, dehumidifying, and/or other condensate-producing equipment, and simultaneously prevents air from entering or escaping from the equipment.

As an example—certain exemplary embodiments are in the technical field associated with a rooftop air-handling unit that would have a cooling coil to cool air going to a building. The cooling coil would generate water condensate during warm periods. More particularly, certain exemplary embodiments are in the technical field of a condensate drainage system that allows removal of liquid (in most cases the liquid is water) from the unit while simultaneously preventing passage of gases to or from the unit.

The traps on certain condensate-producing equipment can require a liquid, such as water and will henceforth be identified as water, contained within a standpipe, referred to as a "P" trap (although the shape can more closely resemble the letter "U"), to prevent gas from entering or leaving the unit. As a result, traps can be susceptible to freezing and breaking or at other times drying out and allowing gas to escape or enter the equipment. In addition, during periods when exposed to freezing weather, the water in the trap can freeze, expand, and break the trap. Other issues that can be caused by a negative pressure trap becoming dry after an extended period of no condensate being produced is that upon condensing the air rushing into the unit can prevent the condensate from exiting the floor drain resulting in a geyser of water blowing into the entire unit plenum, which can cause wet insulation, motors, controls, fan bearings, etc., possibly leading to considerable damage. Dry negative traps can lead to the drain pan overflowing. With positive pressure plenums, it is possible that a dry trap would, because of air velocity within the trap, never sufficiently fill with water to prevent the air from exiting the system.

Certain exemplary embodiments need not require standing liquid to prevent gas (typically air) from entering or leaving the condensate-producing unit. With the occurrence of condensate within the unit, the liquid condensate flows out of the unit but substantially no gas escapes or enters. When there is no condensate produced, there is no liquid in the trap and there is substantially no gas flowing through the trap.

In a condensate-producing system, a "P trap" can serve as a style of condensate drain trap that can operate by creating a barrier of water between a condensing heat exchanger and the environment to which the condensate drains, the trap preventing the flow of air into and/or from an Air Handling Unit (AHU) and/or other components of the system. During the cooler months of the year, the cooling coils of the heat exchanger typically are not in operation, and the water that creates the barrier between the drain environment and the AHU usually remains in the trap. During winter (especially in northern latitudes), the temperature can drop below freezing, which can cause the remaining water in the P-trap to freeze. When the water in the trap freezes, the trap can break due to the expansion of the water. When air conditioners turn back on during the warmer months of the year, the trap, now broken, will not perform properly. Water leaks from a broken trap and associated piping system could result in extensive and/or growing water damage until the problem is rectified.

Comparing certain exemplary embodiments, there can be two different design principles involved. One principle relates to a trap that can operate to remove water from an Air Handling Unit (AHU) when the water drained is in a positive pressure condition relative to ambient, and the other relates to a trap that can operate to remove water produced in a negative pressure relative to ambient. Even though their operating principles are different, both can use a hollow float or ball-like structure (sometimes referred to generally herein as a "float" or a "ball", although it can be in the shape of a group of balls or an elongated ball or any other three-dimensional geometric structure or group of structures that is buoyant and/or has at least one portion that defines a substantially convex, spherical, and/or hemispherical surface) in combination with a stationary, substantially smooth, substantially annular seat where, when the ball is forced against the seat, essentially no air can flow and when water is produced the ball is caused to move substantially away from the seat so that water can flow but substantially no air flows. With no water produced, the ball can stay against the seat by air pressure differential such that substantially no air flows.

FIG. 1A illustrates a side view of an exemplary embodiment of a P trap. FIG. 1B illustrates a side view of an exemplary embodiment of a field-manufactured P trap. FIG. 2A is a photograph of a side view of an exemplary P trap that has a removable plug for cleaning out debris from the lowest portion of the trap. FIG. 2B illustrates a side view of an exemplary P trap that has a removable plug for cleaning out debris from the lowest portion of the trap. An example where a P trap might perform properly all year long would be in a tropical region where the temperature never went below freezing and water drained all year to the trap. An example of when it might not work well is in a cold climate where air conditioning during summer fills the trap but as cold weather sets on, the water in the trap freezes and therefore expands, leading to breakage of the sidewall of the trap. To prevent freezing of that water can require the application of electrical heat tracing of the trap. Another example where a "P" trap can fail to operate properly is on applications where AHUs are used to cool re-circulated air used for cooling computers in data centers. The air to be cooled can come to the AHU at about 100° F. and can cool to 70° F. before returning to the air conditioned space. Air-to-air heat exchangers can use ambient air to cool the recirculating air. When the ambient air is too warm to allow full cooling a backup mechanical cooling system can perform the "trim" (or remaining) cooling. Moisture can be condensed from the recirculating air during the trim cooling process but this would seldom occur. The "P" traps can fill with water and operate as intended while condensing is taking place, passing water and preventing airflow. However, because of the 100° F. return temperature, the traps can dry very quickly after trim cooling is no longer required, leaving no barrier to prevent ambient air from entering or leaving the AHU. As shown in FIG. 3, the level of water 3100 in a P trap can become sufficiently low that gas 3200 can flow past that water, and thus FIG. 3 illustrates gas leakage from a condensate-producing unit if a P trap becomes dry. Avoiding this scenario can require manual filling of the traps on a regular basis, which can be time consuming and costly, especially on large data centers where there may be 20 large AHUs, each having 5 to 10 separate traps. When using a "P" trap, it can be required for the operator to take care to: a) prevent standing water from freezing and b) prevent the traps from evaporating or losing sufficient water to allow blockage of airflow.

Figure 5:
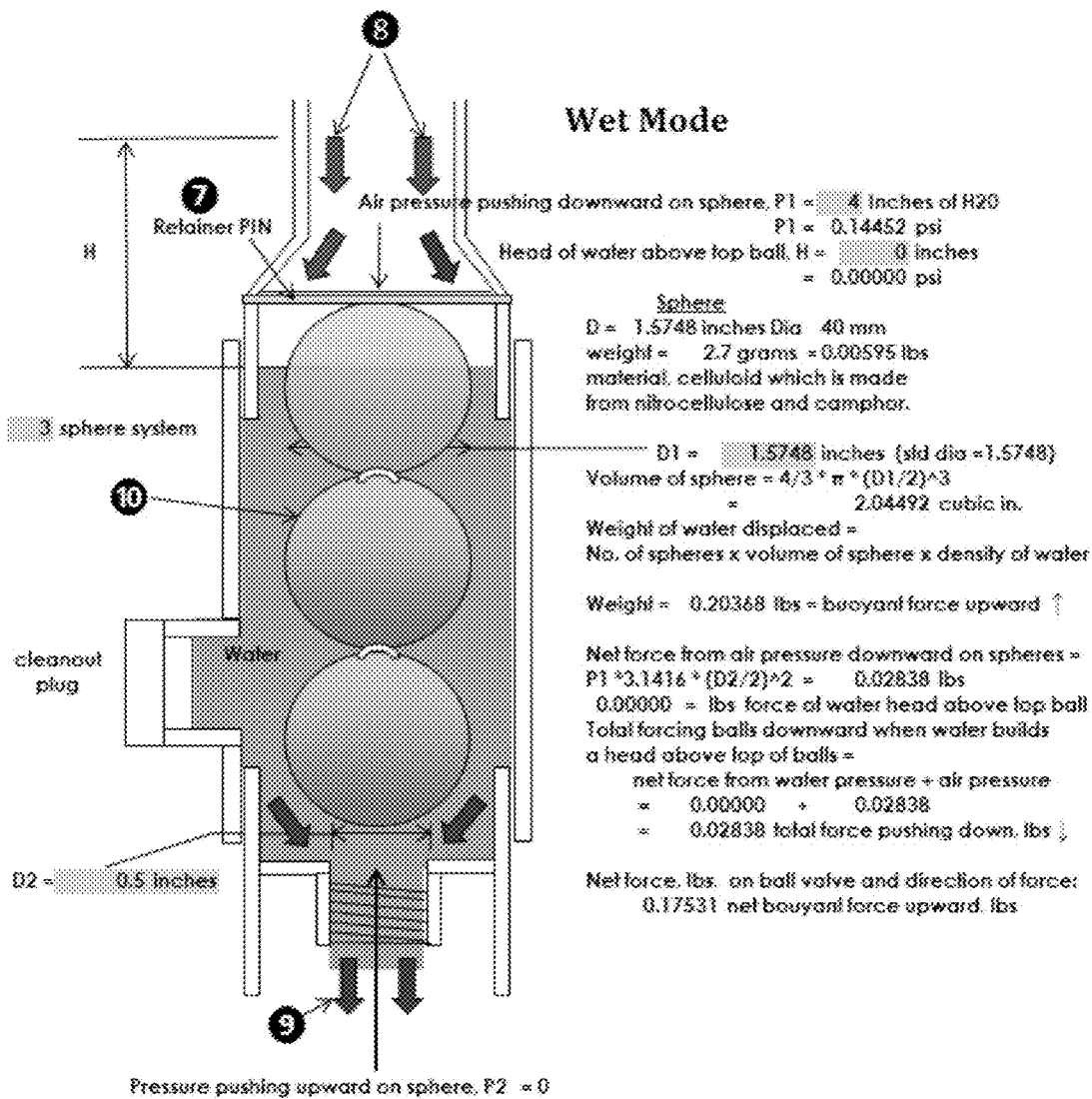
FIG. 5 is a drawing of an exemplary embodiment of a positive pressure trap when condensate is being produced, and thus is in a wet mode.
Figure 6:
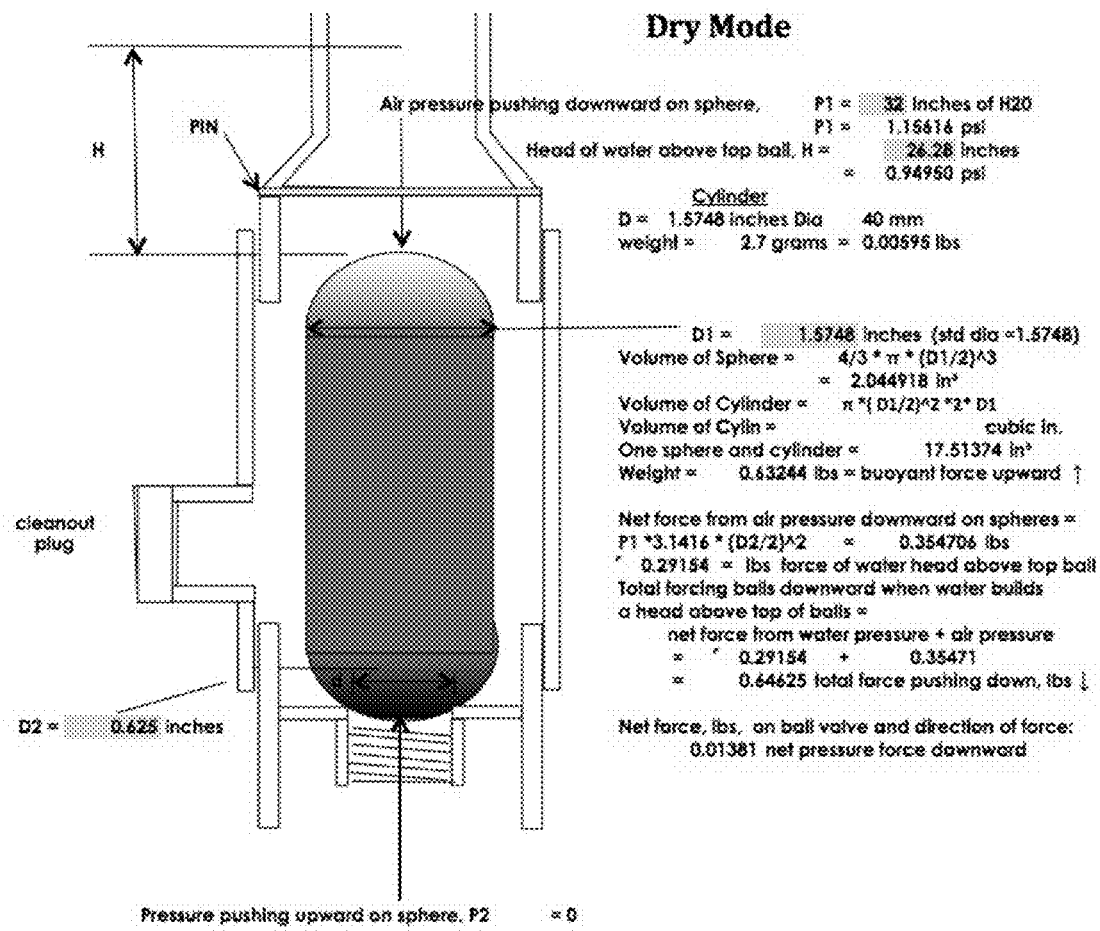
FIG. 6 is a drawing of an exemplary embodiment of a positive pressure trap with no condensate is being produced, and thus is in a dry mode.
Figure 7:
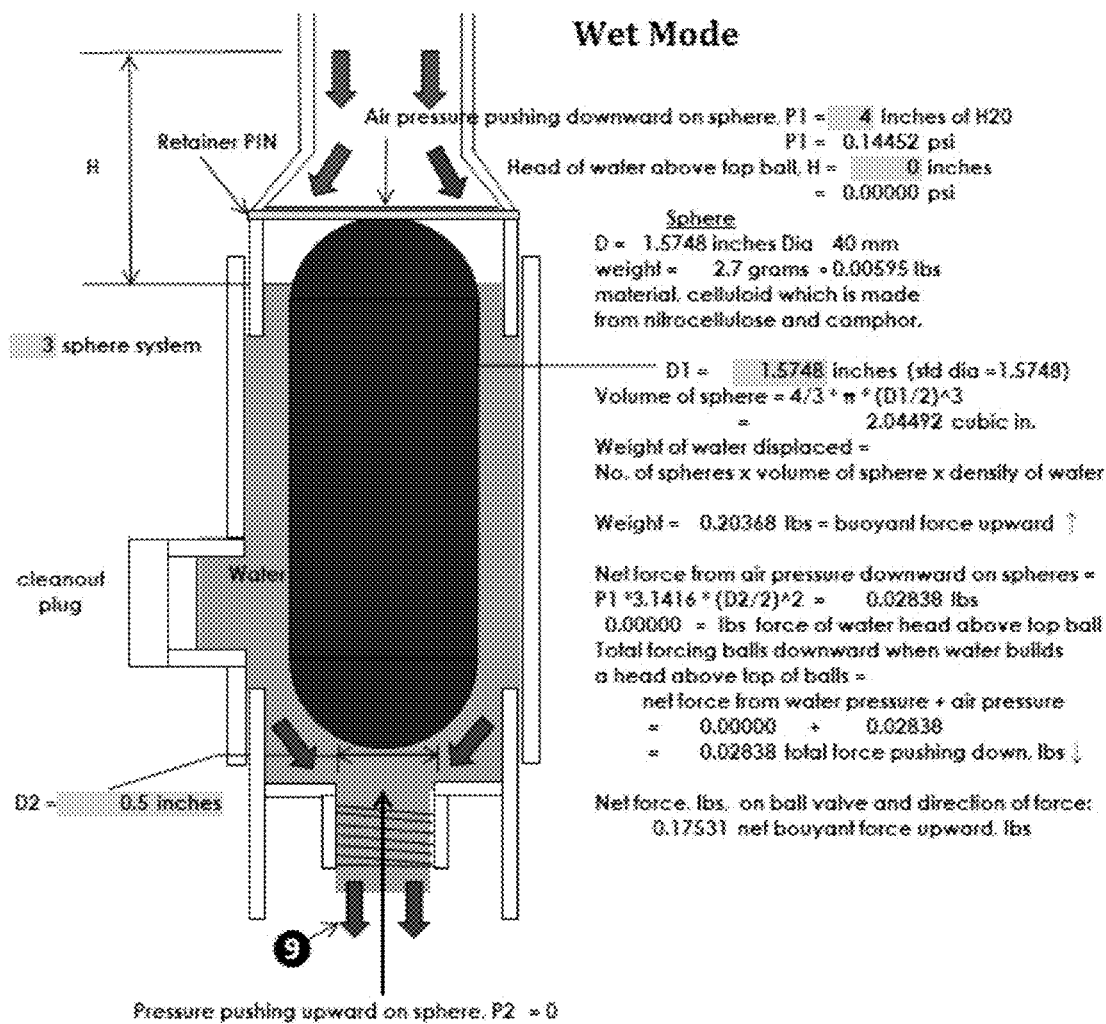
FIG. 7 is a drawing of an exemplary embodiment of a positive pressure trap when condensate is being produced, and thus is in a wet mode.

An exemplary embodiment of a positive pressure trap that is shown in FIGS. 4 and 5, and/or another exemplary embodiment of a positive pressure trap that is shown in FIGS. 6 and 7, can eliminate two major concerns associated with "P" traps, namely the possibility of water freezing and breaking the trap, and drying-out of the trap resulting in air bypass.

Operation of Positive Plenum Pressure Trap

Referring to the exemplary embodiment of a positive pressure trap that is illustrated in FIG. 4, when there is no water flowing into the trap from the top, the positive pressure in the AHU plenum 4-1 can manifest itself as a force 4-2 acting in a downward direction on the spherical balls, which are welded together at points 4-3. This force can be modeled as, with no water present, the downward force on the welded balls is the cross sectional area of the seat, $A_2 = (\pi/4) \times D_2^2$, times the pressure, $P_1$ existing in the positively pressurized plenum 4-1. Likewise, the force pushing upward on the welded-ball assembly is the air pressure $P_2$ at 4-5, typically ambient pressure, times the area of the seat 4-6 or $A_2 = (\pi/4) \times D_2^2$. The net vertical downward force on the ball assembly then can be modeled as:

Force=$Fd$=$-(P_1 \times A_2) + (P_2 \times A_2)$, where a net positive force acts upward and a net negative force acts downward. Since the pressure, $P_2$, in the final drain line to the outside is ambient, or zero static pressure, then the net force is always zero or negative. A negative force pushes the ball assembly against the seat, which prevents air from exiting the plenum.

Referring to the exemplary embodiment of a positive pressure trap that is illustrated in FIG. 5, when water 5-8 begins to flow into the trap an additional force acts on the ball assembly and that is buoyancy resulting from the balls 5-10 in the welded ball assembly being hollow. The forces described in the previous paragraph are still present in this aspect of the model, but now the buoyancy adds force B to the previous equation. The buoyancy force is always positive so the net force is Force=$Fw$=$-(P_1 \times A_2) + B$ (where $A_2$ is the projected area of the ball)

The buoyant force is equal to the weight of water displaced by the submerged portion of the ball assembly. At a certain water level and/or volume, as the water fills the annulus around the hollow-ball assembly, the buoyant force B becomes greater than force Fd which causes the welded ball assembly to lift from its seat allowing water 5-9 to flow through and/or out of the trap. Once the ball assembly lifts from its seat, only the buoyant force is in play. At low water flow emanating from the water source, the ball assembly floats in the water sufficiently above the seat to allow the entering flow of water to exit at the seat. As the water flow increases, the ball assembly can rise to a point that it blocks water from entering the trap, so a ball stop or block 5-7, which in certain embodiments can be pin-like in configuration, can be located as shown in FIG. 5 to prevent the ball assembly from rising to a level that would cause a blockage to incoming water flow. Without block 5-7, a pulsing of flow can occur at higher water flow.

When water ceases to emanate from the source the ball assembly can rest against the seat 4-6 and seal against airflow with the force pushing the ball against the seat being Fd. The positive pressure trap design can be operated in the vertical position as shown in FIGS. 4 and 5. Water flow direction and the word "Top" is marked on the outer case of the trap.

FIGS. 6 and 7 illustrate an embodiment of a positive pressure trap that can demonstrate the same principles, but using an elongated float or ball. Each of FIGS. 4, 5, 6, and 7 present exemplary calculations for designing a corresponding trap.

Figure 8A:
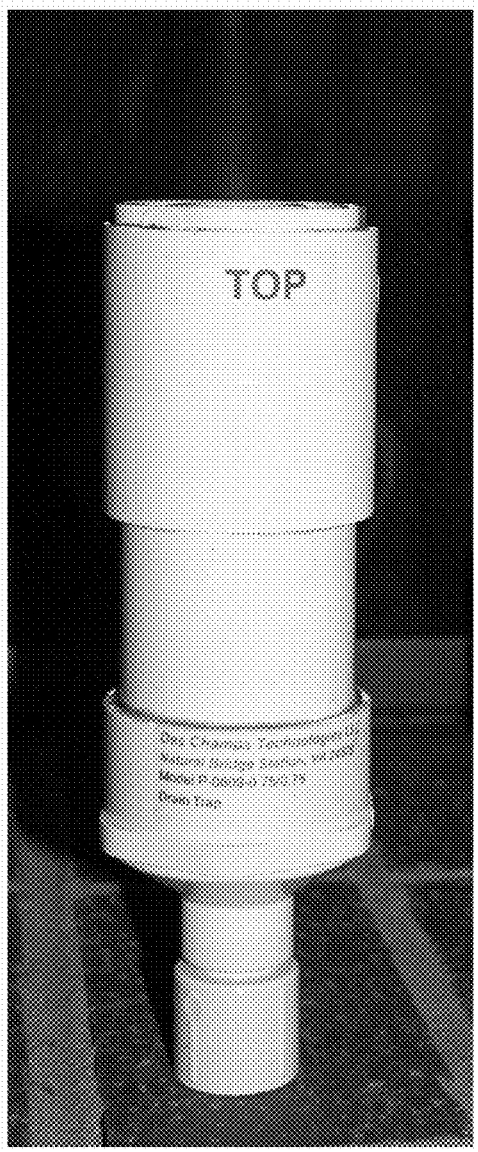
FIG. 8A and FIG. 8B are photographs of two different exemplary embodiments of a positive pressure trap.
Figure 8B:
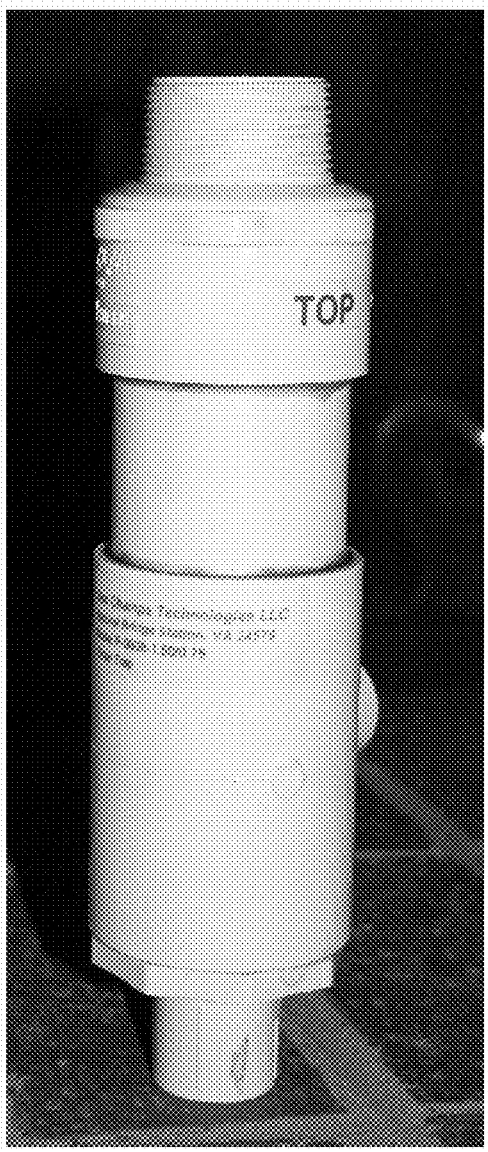
Figure 9:
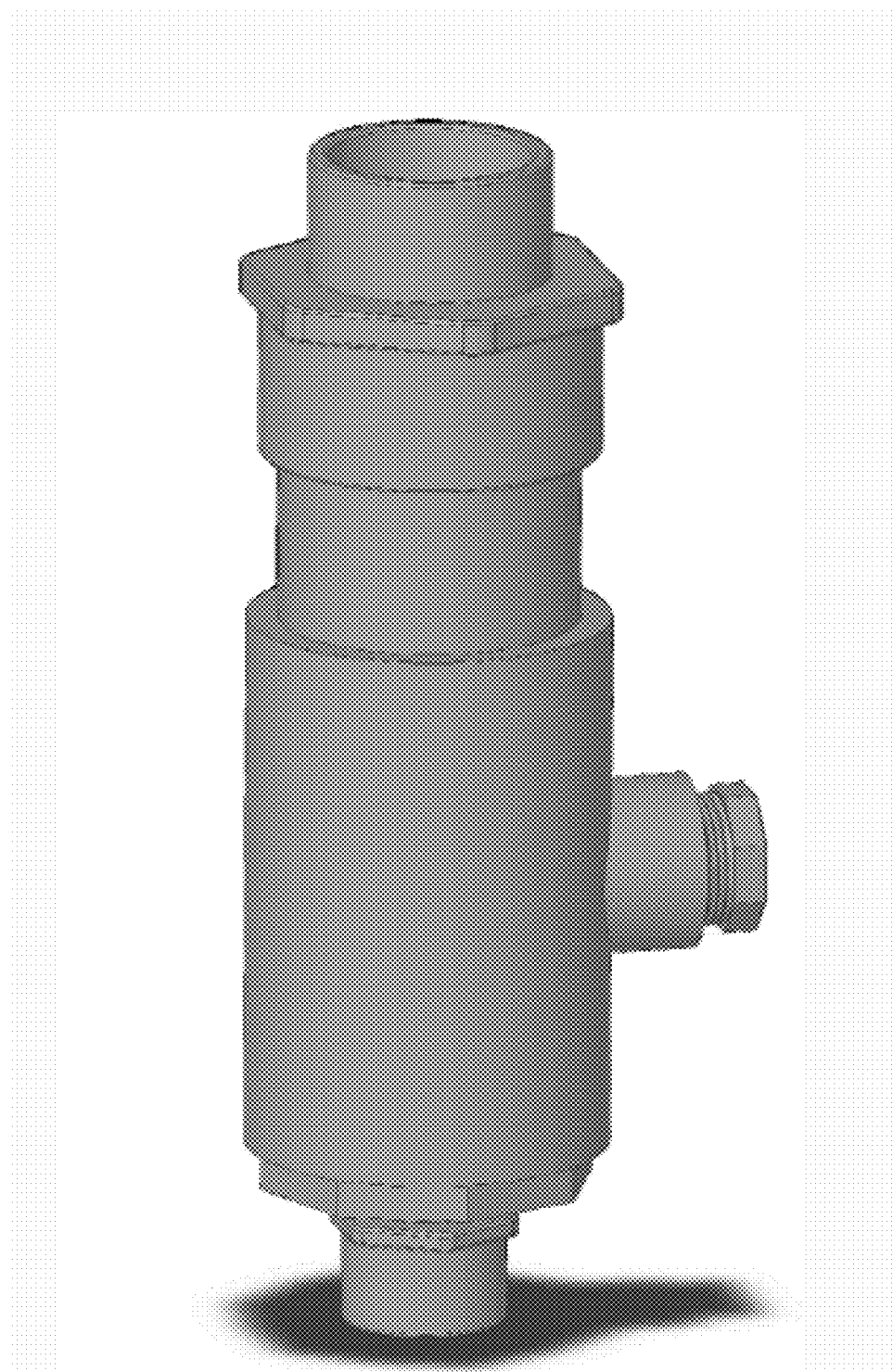
FIG. 9 is a perspective view of an exemplary embodiments of a positive pressure trap.
Figure 10:
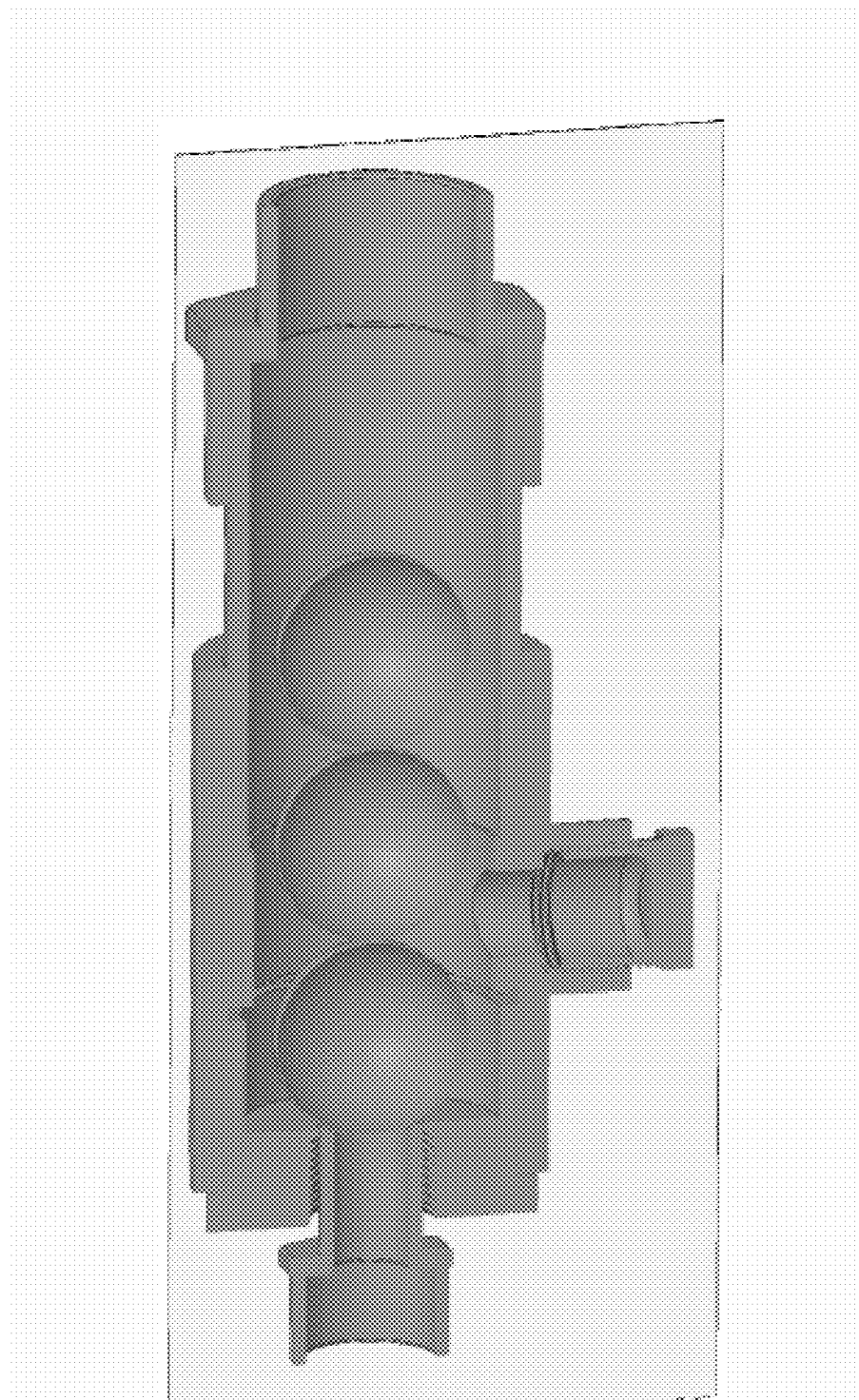
FIG. 10 is a cut-away view of the exemplary embodiments of a positive pressure trap show in FIG. 9.

FIG. 8A is a photograph of an embodiment of a positive pressure trap, the photograph not showing a clean-out. FIG. 8B is a photograph of an embodiment of a positive pressure trap, the photograph showing a clean-out. FIG. 9 is a perspective view of an embodiment of a positive pressure trap that has a clean-out. FIG. 10 is a cut-away view of the embodiment of a positive pressure trap shown in FIG. 9.

Operation of Negative Plenum Pressure Trap

Figure 11:
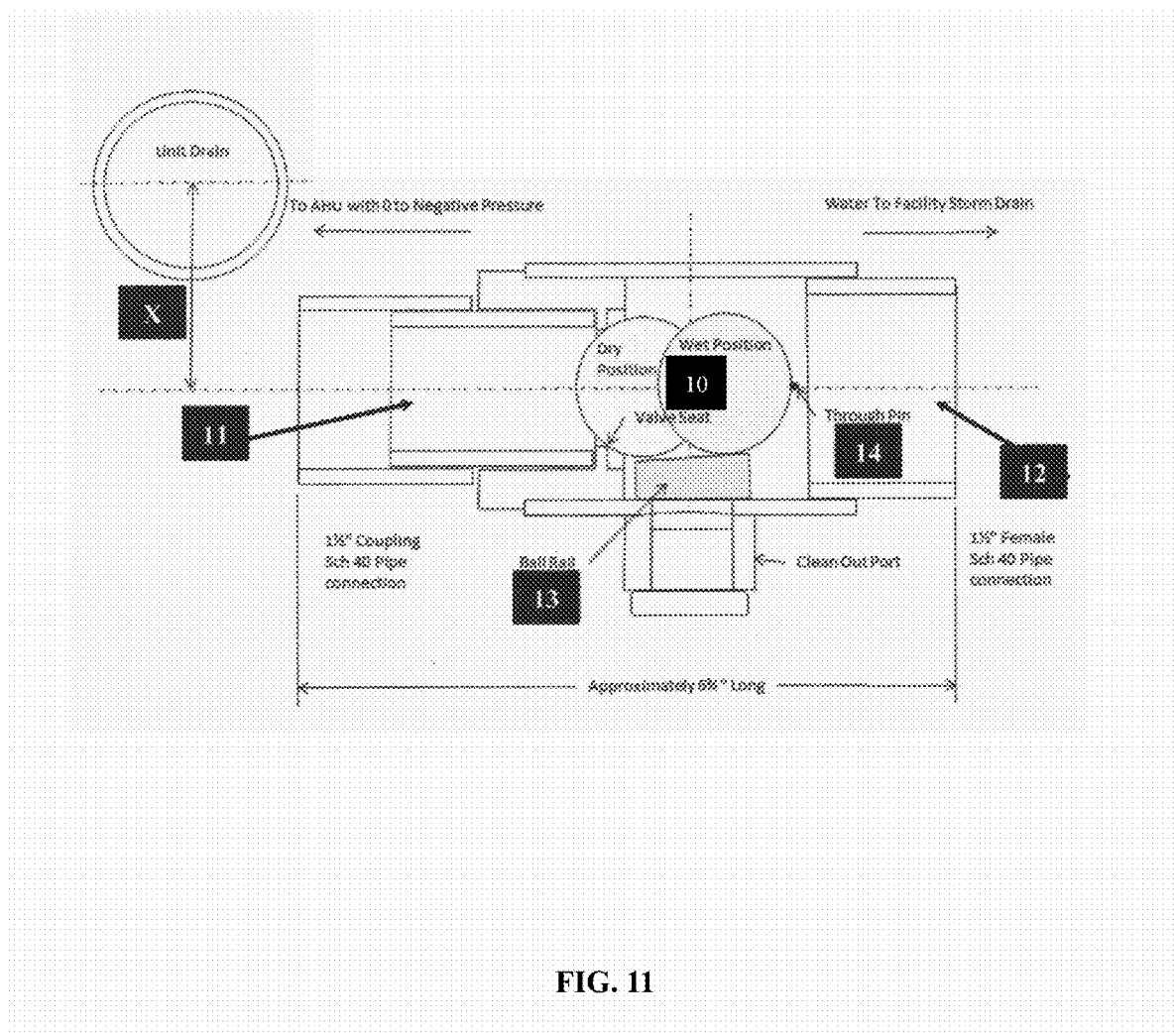
FIG. 11 is a schematic view of an exemplary embodiment of a negative pressure trap, showing both the dry position and the wet position.
Figure 12:
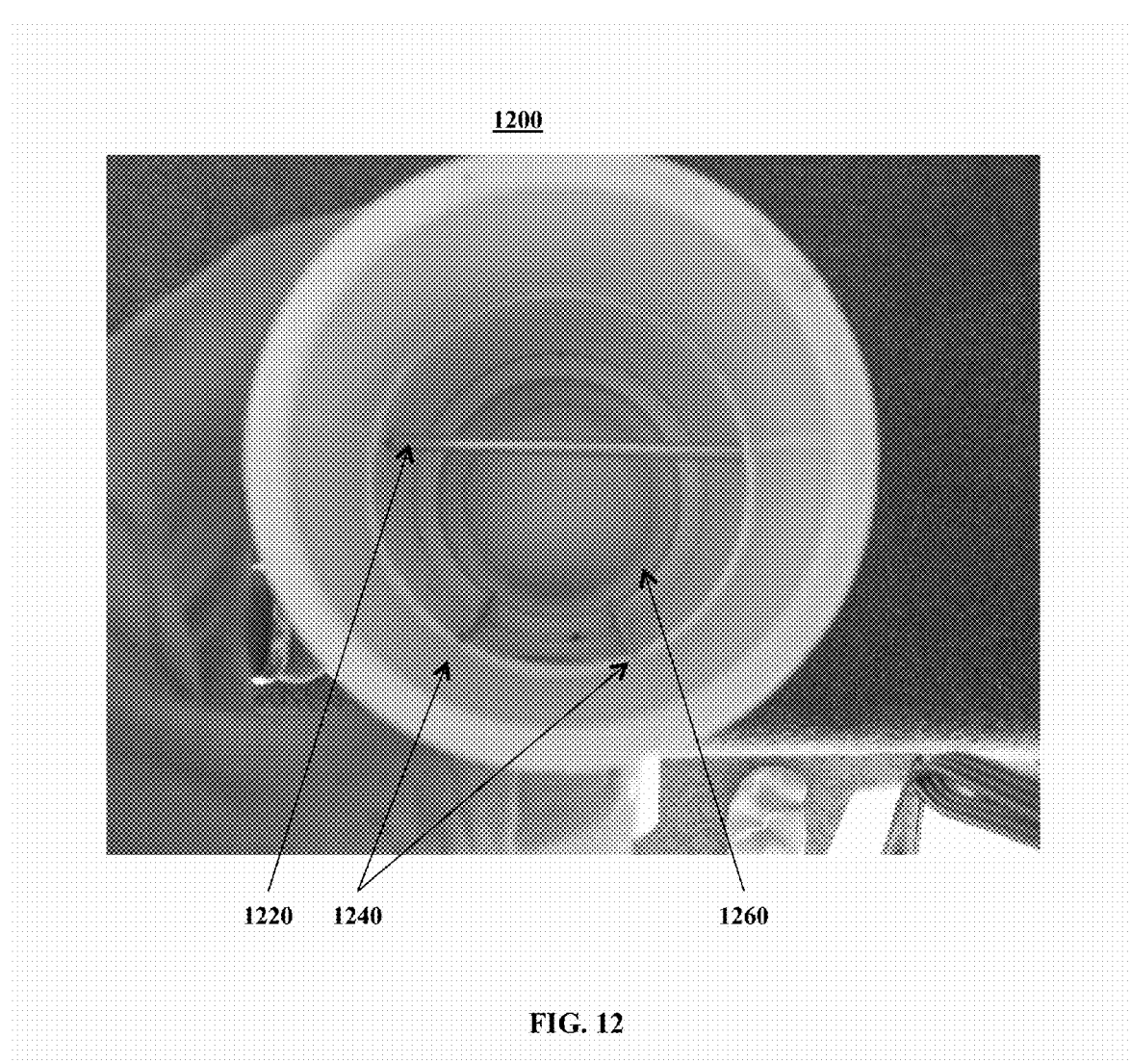
FIG. 12 is a photographed end view of an exemplary embodiment of a negative pressure trap.

The negative plenum dry trap, like the positive pressure trap, can use a float and/or hollow ball that presses against an annular seat because of a pressure differential to seal air from entering the AHU plenum when no water develops in the plenum. When the water head in the entering standpipe 11-X exceeds the negative pressure head in the AHU plenum and/or exceeds a predetermined level, amount, and/or volume, the ball can move away from the valve seat, and water can flow through the trap. With regard to certain exemplary embodiments, FIG. 11 shows the hollow ball held in position against the substantially annular valve seat 11-10, because of a pressure differential, when in a dry state and displaced to the right against the block or stop 11-14 (which in certain embodiments can be pin-like in configuration) that can prevent the ball from exiting the trap. When water stops flowing from the plenum, the hollow ball can move to the left and form an air seal when the ball substantially seals against the valve seat 11-10 because of the negative pressure differential between points 11-11 and 11-12. The ball rail 11-13 can be of a height and/or slope that aids in directing the ball back to the center of the valve seat 11-10 when the pressure in the plenum is low or the AHU system shuts down and the pressure goes to zero. In addition, when the AHU begins operation, the ball can be in a position to nearly instantly seat. FIG. 12 illustrates an exemplary embodiment of a negative pressure trap 1200 and shows the exit end of the trap with the stop 12-14, ball rails 12-13, and valve seat 12-15. The negative pressure trap 1200 can (and in some embodiments must) be installed substantially horizontally with the ball rails 12-13 on the bottom. Strainers or screens can be placed over the drains in the AHU to reduce or prevent debris from entering the traps.

In certain exemplary embodiments of the positive pressure trap and/or the negative pressure trap, the ball can be lightweight, hollow, and/or plastic, and/or can be similar in material, geometry, and/or construction to a Ping-Pong ball. The seat it rests against to form the seal can be PVC. Two hard surfaces sometimes can form a good seal but not necessarily a perfect seal. Not being a perfect seal and/or providing a leaky mating between the float and the seat can be desirable in certain exemplary embodiments. The reason for not seeking a perfect seal and/or for seeking an imperfect and/or leaky seal is the desire that, after a relatively short period from when the water stops flowing from the AHU plenum, no water remains in the standpipe leading to the trap. If the seal is perfect then the water in the standpipe will have a height equivalent to the negative pressure in the plenum and that water could freeze and/or cause damage to the trap and/or drain line from the AHU. A trap that substantially prevents airflow when little to no water is being produced, allows water to exit the AHU when sufficient water is being produced and/or is present in the trap, and generally does not hold water when water is not being produced can be very desirable in many applications.

It also can be desirable to be able to clean the trap when necessary. In certain exemplary embodiments, the positive pressure trap and/or the negative pressure trap can incorporate clean out access for a water hose and/or an air hose.

Figure 13:
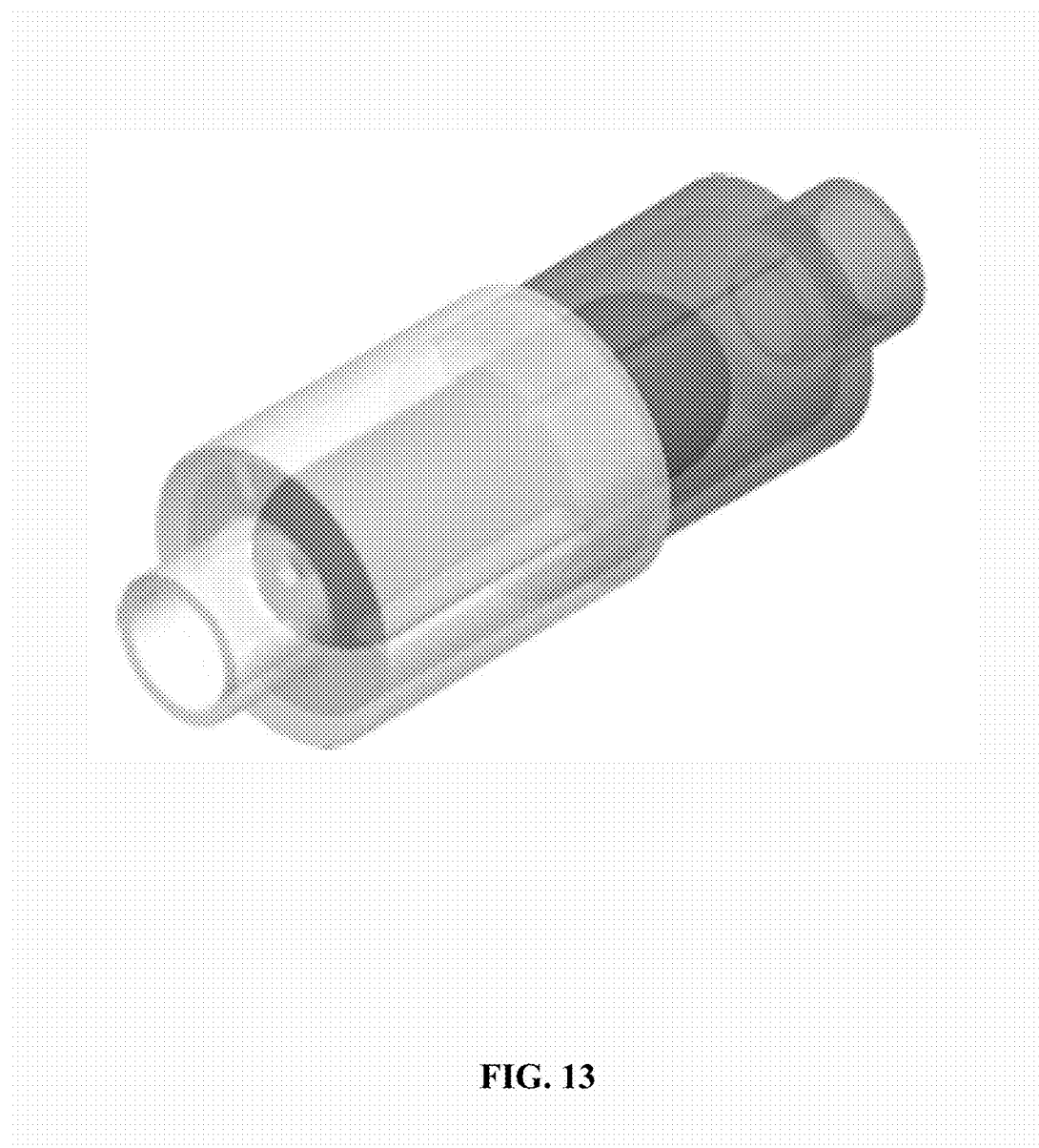
FIG. 13 is a perspective view of an exemplary embodiments of a negative pressure trap.
Figure 14:
FIG. 14 is a photographed side view of an exemplary embodiment of a negative pressure trap.

FIG. 13 is a perspective view of an exemplary embodiment of a negative pressure trap having an elongated float. FIG. 14 is a side view of exterior surfaces of an exemplary embodiment of a negative pressure trap.

Certain exemplary embodiments of both the positive pressure trap and the negative pressure trap have been tested. Some operational test data for the negative pressure trap are shown in FIG. 15.

Certain exemplary embodiments can provide a condensate trap, comprising:
  a float comprising at least one convex surface;
  a housing configured to:
    receive condensate from a condensate-producing source; and/or contain said float;
  a stationary, substantially smooth, and substantially annular seat located within said housing and configured to form an imperfect fluidic seal with the float when in contact with the convex surface of the float;
  a stop configured to prevent the float from blocking a flow of condensate into the condensate trap from the condensate-producing source;
  a stop configured to prevent the float from exiting the condensate trap;
  a float rail configured to direct said float against said seat; and/or
  a clean-out configured for removing debris from the condensate trap;
  wherein:
    said condensate trap is configured to:
      when any condensate located within said housing is more than a predetermined volume, allow the condensate to exit from said housing to a condensate drain and simultaneously prevent air from flowing through said housing between the condensate-producing source and the condensate drain;
      when any condensate located within said housing is less than the predetermined volume, substantially prevent air from flowing through said housing between the condensate-producing source and the condensate drain;
    said seal forms a substantially annular ring about a substantially horizontal axis;
    said seal forms a substantially annular ring about a substantially vertical axis;
    said housing is configured to substantially limit horizontal movement of said float to a predetermined range;
    said housing is configured to substantially limit vertical movement of said float to a predetermined range;
    said seat is configured to substantially support the float when in contact with the convex surface of the float;
    said condensate trap is configured to, when any condensate located within said housing is less than the predetermined volume, not allow the condensate to exit from said housing to the condensate drain; and/or
    said condensate trap is configured to, when any condensate located within said housing is greater than the predetermined volume, allow the condensate to exit from said housing to the condensate drain.

Definitions

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.
about—around and/or approximately.
above—at a higher level.
across—from one side to another.
activity—an action, act, step, and/or process or portion thereof
adapt—to design, make, set up, arrange, shape, configure, and/or make suitable and/or fit for a specific purpose, function, use, and/or situation.
after—following in time and/or subsequent to.
against—in contact with so as to rest and/or press on, so as to come into forcible contact with, and/or contrary to and/or in a direction and/or course opposite to.
air—the earth's atmospheric gas.
allow—to provide, let do, happen, and/or permit.
along—through, on, beside, over, in line with, and/or parallel to the length and/or direction of; and/or from one end to the other of
and—in conjunction with.
and/or—either in conjunction with or in alternative to; or any individual one of or any combination of
annular—shaped like a ring.
any—one, some, every, and/or all without specification.
apparatus—an appliance or device for a particular purpose.
approximately—about and/or nearly the same as.
around—about, surrounding, and/or on substantially all sides of; and/or approximately.
as long as—if and/or since.
associate—to join, connect together, and/or relate.
at—in, on, and/or near.
at least—not less than, and possibly more than.
at least one—not less than one, and possibly more than one.
axis—a straight line about which a body and/or geometric object rotates and/or can be conceived to rotate and/or a center line to which parts of a structure and/or body can be referred.
between—in a separating interval and/or intermediate to.
block—(n) an obstacle and/or the act of blocking; (v) to obstruct, stop and/or or impede the passage of and/or movement through; obstruct, and/or to prevent from happening, succeeding, and/or progressing.
by—via and/or with the use and/or help of.
can—is capable of, in at least some embodiments.
cause—to bring about, provoke, precipitate, produce, elicit, be the reason for, result in, and/or effect.
circular—round and/or having the shape of a circle.
clean-out—an access for inspecting, reaching, and/or removing obstructions, debris, and/or contaminants; and/or a pipe fitting containing a removable plug that provides access for inspection and/or cleaning of the pipe run.
comprising—including but not limited to.
condensate—material derived by a change in physical state from a vapor to a liquid.
configure—to design, arrange, set up, shape, and/or make suitable and/or fit for a specific purpose, function, use, and/or situation.
connect—to join or fasten together.
contact—to physically touch and/or come together.
containing—including but not limited to.
convert—to transform, adapt, and/or change.
convex—an surface such that for any pair of points on the surface, any point on the straight line segment that joins the pair of points is under the object.
corresponding—related, associated, accompanying, similar in purpose and/or position, conforming in every respect, and/or equivalent and/or agreeing in amount, quantity, magnitude, quality, and/or degree.
coupleable—capable of being joined, connected, and/or linked together.
coupling—linking in some fashion.
create—to bring into being.
debris—a solid substance and/or the remains of something destroyed, disintegrated, and/or decayed.
define—to establish the meaning, relationship, outline, form, and/or structure of; and/or to precisely and/or distinctly describe and/or specify.
derive—to receive, obtain, and/or produce from a source and/or origin.
determine—to find out, obtain, calculate, decide, deduce, ascertain, and/or come to a decision, typically by investigation, reasoning, and/or calculation.
device—a machine, manufacture, and/or collection thereof
direct—to point, aim, control, cause, provide instruction to, send toward a place and/or object, and/or cause to move in or follow a predetermined course.
drain—(n) a pipe an/or or channel that carries off water, liquid, slurry, waste, sewage, etc.; (v) to empty, cause liquid to go out from, draw off (a liquid) by a gradual process, and/or become empty by the drawing off of liquid.
each—every one of a group considered individually.
effective—sufficient to bring about, provoke, elicit, and/or cause.
embodiment—an implementation, manifestation, and/or concrete representation.
estimate—(n) a calculated value approximating an actual value; (v) to calculate and/or determine approximately and/or tentatively.
exemplary—serving as an example, instance, and/or illustration.
exit—(n) a path, passage, and/or way leading through an opening and away from an interior of a container; (v) to leave, go away, and/or flow out of
first—an initial element in a set.
float—(n) a buoyant object; (v) to cause to and/or to remain suspended within and/or on the surface of a fluid without sinking
flow—(n) the act of flowing, a continuous transfer, and/or a stream and/or current; (v) to pour forth, issue in a stream, and/or move and/or run smoothly with unbroken continuity, as in the manner characteristic of a fluid.
fluid—a liquid, slurry, vapor, mist, cloud, plume, and/or foam, etc.
fluidic—relating to a fluid.
for—with a purpose of.
form—to create, construct, and/or cause to exist.
from—used to indicate a source, origin, and/or location thereof
further—in addition.
generate—to create, produce, give rise to, and/or bring into existence.
having—including but not limited to.
horizontal—parallel to and/or in the plane of the horizon.

housing—something that covers, encloses, protects, holds, and/or supports, such as a frame, box, and/or chassis.

imperfect—not perfect and/or complete.

including—including but not limited to.

initialize—to prepare something for use and/or some future event.

install—to connect or set in position and prepare for use.

into—to a condition, state, or form of.

is—to exist in actuality.

less than—having a measurably smaller magnitude and/or degree as compared to something else.

limit—(n) a furthest and/or finite extent and/or point beyond which something cannot and/or may not proceed; (v) to restrict, confine, and/or otherwise control within specified bounds.

located—situated in a particular spot, region, and/or position.

may—is allowed and/or permitted to, in at least some embodiments.

method—one or more acts that are performed upon subject matter to be transformed to a different state or thing and/or are tied to a particular apparatus, said one or more acts not a fundamental principal and not pre-empting all uses of a fundamental principal.

more—a quantifier meaning greater in size, amount, extent, and/or degree.

movement—an act and/or instance of moving and/or a change in place and/or position from one location to another.

no—an absence of and/or lacking any.

not—a negation of something and/or in no way.

one—being and/or amounting to a single unit, individual, and/or entire thing, item, and/or object.

operable—practicable and/or fit, ready, and/or configured to be put into its intended use and/or service.

or—a conjunction used to indicate alternatives, typically appearing only before the last item in a group of alternative items.

outside—beyond a range, boundary, and/or limit; and/or not within.

per—for each and/or by means of plurality—the state of being plural and/or more than one.

portion—a part, component, section, percentage, ratio, and/or quantity that is less than a larger whole.

pre-—a prefix that precedes an activity that has occurred beforehand and/or in advance.

predetermine—to determine, decide, and/or establish in advance.

prevent—to hinder, avert, and/or keep from occurring.

prior—before and/or preceding in time or order.

produce—to generate, create, and/or supply.

product—something produced by human and/or mechanical effort.

project—to calculate, estimate, or predict.

provide—to furnish, supply, give, and/or make available.

rail—a guide, running surface, and/or substantially horizontal bar and/or member configured for supporting and/or guiding another thing.

range—a measure of an extent of a set of values and/or an amount and/or extent of variation.

ratio—a relationship between two quantities expressed as a quotient of one divided by the other.

receive—to get as a signal, take, acquire, and/or obtain.

recommend—to suggest, praise, commend, and/or endorse.

reduce—to make and/or become lesser and/or smaller.

remove—to eliminate, remove, and/or delete, and/or to move from a place or position occupied.

repeat—to do again and/or perform again.

repeatedly—again and again; repetitively.

request—to express a desire for and/or ask for.

result—(n.) an outcome and/or consequence of a particular action, operation, and/or course; (v.) to cause an outcome and/or consequence of a particular action, operation, and/or course.

ring—a substantially toroidal object which can be imagined as having been generated by rotating a closed loop (e.g., ellipse, circle, irregular curve, polygon, etc.) about a fixed line external to the loop.

said—when used in a system or device claim, an article indicating a subsequent claim term that has been previously introduced.

seal—(v.) to shut close; to keep close; to make fast; to keep secure; to prevent leakage; (n.) a device configured to shut close; to keep close; to make fast; to keep secure; and/or to prevent leakage.

seat—(n) a sealing, supporting, and/or mating surface; (v) to attach to, seal against, support with, and/or bring firmly into contact with.

select—to make a choice or selection from alternatives.

set—a related plurality.

simultaneously—happening, existing, or done at the same time.

smooth—lacking substantial surface irregularities, roughness, and/or projections.

source—a point at which something originates, springs into being, and/or from which it derives and/or is obtained.

species—a class of individuals and/or objects grouped by virtue of their common attributes and assigned a common name; a division subordinate to a genus.

stationary—substantially fixed with respect to an object of reference.

stop—(n) an obstacle and/or impediment to travel and/or the act of stopping; (v) to interrupt, cease and/or end, and/or to block and/or prevent the flow or passage of substantially—to a great extent and/or degree.

support—to bear the weight of, especially from below.

surface—an outer boundary of a body, object, and/or thing and/or any material layer and/or face constituting and/or resembling such a boundary.

system—a collection of mechanisms, devices, machines, articles of manufacture, processes, data, and/or instructions, the collection designed to perform one or more specific functions.

than—used after a comparative adjective or adverb to introduce the second element or clause of an unequal comparison that—used as the subject or object of a relative clause.

through—across, among, between, and/or in one side and/or opening and out the opposite and/or another side and/or opening of to—a preposition adapted for use for expressing purpose.

transform—to change in measurable: form, appearance, nature, and/or character.

trap—a device configured to substantially prevent and/or resist flow of one or more fluids.

upon—immediately or very soon after; and/or on the occasion of use—to put into service.

vertical—substantially perpendicular to horizontal.

via—by way of and/or utilizing.

volume—a mass and/or a three-dimensional region that an object and/or substance occupies.

weight—a force with which a body is attracted to Earth or another celestial body, equal to the product of the object's mass and the acceleration of gravity.

when—at a time and/or during the time at which.

wherein—in regard to which; and; and/or in addition to.

with—accompanied by.

with regard to—about, regarding, relative to, and/or in relation to.

with respect to—about, regarding, relative to, and/or in relation to.

within—inside the limits of.

zone—a region and/or volume having at least one predetermined boundary.

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor expects skilled artisans, after obtaining authorization from the inventor to implement such variations, details, and/or equivalents as appropriate, and the inventor therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly inoperable or contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential";

any two or more described substances can be mixed, combined, reacted, separated, and/or segregated;

any described characteristics, functions, activities, substances, and/or structural elements can be integrated, segregated, and/or duplicated;

any described activity can be performed manually, semi-automatically, and/or automatically;

any described activity can be repeated, any activity can be performed by multiple entities, and/or any activity can be performed in multiple jurisdictions; and any described characteristic, function, activity, substance, and/or structural element can be specifically excluded, the sequence of activities can vary, and/or the interrelationship of structural elements can vary.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all sub-ranges therebetween, such as for example, 1 to 3.65, 2.8 to 8.14, 1.93 to 9, etc., even if those specific values or specific sub-ranges are not explicitly stated.

When any phrase (i.e., one or more words) appearing in a claim is followed by a drawing element number, that drawing element number is exemplary and non-limiting on claim scope.

No claim of this document is intended to invoke 35 USC 112 paragraph six (or paragraph f) unless the precise phrase "means for" is followed by a gerund.

Any information in any material (e.g., a United States patent, United States patent application, book, article, web page, etc.) that has been incorporated by reference herein, is incorporated by reference herein in its entirety to its fullest enabling extent permitted by law yet only to the extent that no conflict exists between such information and the other definitions, statements, and/or drawings set forth herein. In the event of such conflict, including a conflict that would render invalid any claim herein or seeking priority hereto, then any such conflicting information in such material is specifically not incorporated by reference herein. Any specific information in any portion of any material that has been incorporated by reference herein that identifies, criticizes, or compares to any prior art is not incorporated by reference herein.

Applicant intends that each claim presented herein and at any point during the prosecution of this application, and in any application that claims priority hereto, defines a distinct patentable invention and that the scope of that invention must change commensurately if and as the scope of that claim changes during its prosecution. Thus, within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document.

What is claimed is:

1. A condensate trap, comprising:
a float comprising at least one convex surface;
an elongate housing that defines a housing longitudinal axis, said housing configured to:
receive condensate from a condensate-producing source; and
contain said float;
a stop configured to continuously prevent the float from blocking a flow of condensate out of the condensate trap and away from the condensate-producing source; and
a stationary, substantially smooth, and substantially annular seat located within said housing and configured to be operatively oriented substantially vertically and to form an imperfect fluidic seal with the float when in contact with the convex surface of the float;
a bar-like float rail that: defines a rail longitudinal axis that extends substantially parallel to the housing longitudinal axis; is attached or integral to an inside surface of said housing; and is configured to, when the housing longitudinal axis is oriented substantially horizontally, direct said float away from said seat or to direct said float to said seat;
wherein said condensate trap is configured to, when the housing longitudinal axis is oriented substantially horizontally:
when any condensate located within said housing is more than a predetermined volume, allow the condensate to exit from said housing to a condensate drain and simultaneously prevent air from flowing through said housing between the condensate-producing source and the condensate drain; and
when any condensate located within said housing is less than the predetermined volume, substantially prevent air from flowing through said housing between the condensate-producing source and the condensate drain.

2. The condensate trap of claim 1, wherein:
the stop is configured to prevent the float from blocking a flow of condensate into the condensate trap from the condensate-producing source when the housing longitudinal axis is oriented vertically.

3. The condensate trap of claim 1, further comprising:
the stop is configured to prevent the float from exiting the condensate trap in the general direction of condensate flow away from the condensate-producing source.

4. The condensate trap of claim 1, wherein:
the float rail is configured to direct said float to roll away from said seat.

5. The condensate trap of claim 1, wherein:
said seal forms a substantially annular ring about a substantially horizontal axis when the housing longitudinal axis is operatively oriented substantially horizontally.

6. The condensate trap of claim 1, wherein:
said seal forms a substantially annular ring about a substantially vertical axis when the housing longitudinal axis is oriented substantially vertically.

7. The condensate trap of claim 1, wherein:
said stop is configured to substantially limit horizontal movement of said float to a predetermined range when the housing longitudinal axis is oriented substantially horizontally.

8. The condensate trap of claim 1, wherein:
said stop is configured to substantially limit vertical movement of said float to a predetermined range.

9. The condensate trap of claim 1, wherein:
said seat is configured to, when oriented substantially horizontally, substantially support the float when in contact with the convex surface of the float.

10. The condensate trap of claim 1, further comprising:
a clean-out configured for removing debris from the condensate trap.

11. The condensate trap of claim 1, wherein:
said condensate trap is configured to, when any condensate located within said housing is less than the predetermined volume, allow the condensate to exit from said housing to the condensate drain.

12. The condensate trap of claim 1, wherein:
said condensate trap is configured to, when any condensate located within said housing is greater than the predetermined volume, allow the condensate to exit from said housing to the condensate drain.

13. The condensate trap of claim 1, wherein:
the float rail is configured to align said float such that said float circularly contacts said seat to substantially block air from flowing through said seat.

14. The condensate trap of claim 1, wherein:
the float rail is configured to align said float to form a circumferential gap between said float and one or more inner walls of said housing, said gap configured to allow condensate and debris to flow by said float.

15. The condensate trap of claim 1, wherein:
the float rail is configured to direct the float to roll against the seat.

* * * * *